Aug. 25, 1964      A. R. TOPFER      3,146,350
APPARATUS FOR MEASURING DIMENSIONS BY
MEANS OF PULSED RADIANT ENERGY
Filed March 15, 1961
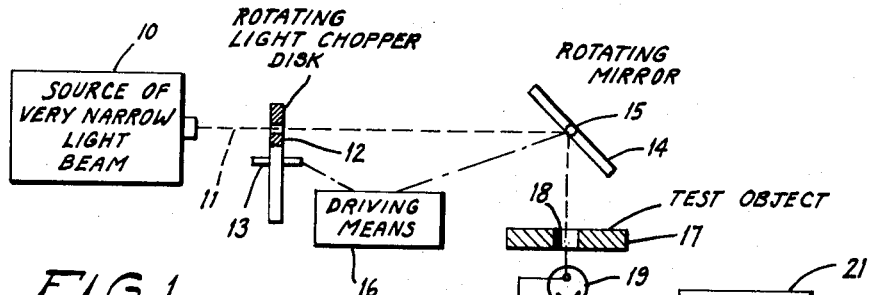
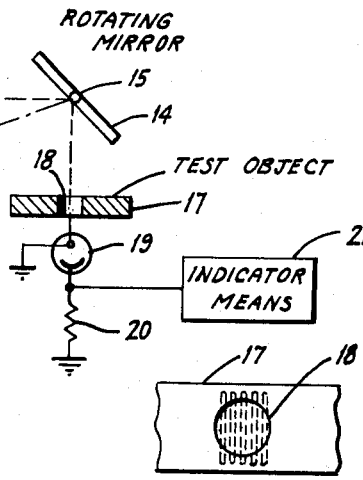
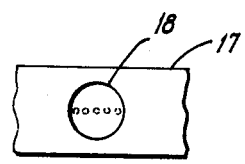
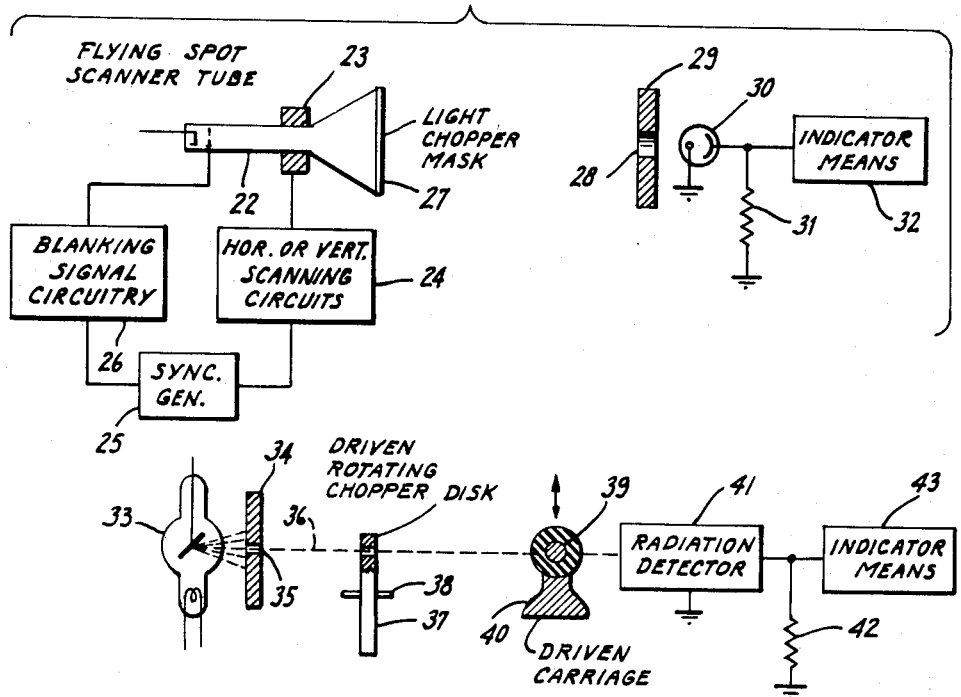
INVENTOR.
ALVIN R. TOPFER
BY
Fordyce A. Bothwell
ATTORNEY 3,146,350
APPARATUS FOR MEASURING DIMENSIONS BY
MEANS OF PULSED RADIANT ENERGY
Alvin R. Topfer, Lima, Pa., assignor, by mesne assignments, to Philco Corporation, Philadelphia, Pa., a corporation of Delaware
Filed Mar. 15, 1961, Ser. No. 95,924
7 Claims. (Cl. 250—83.3)

This invention relates to precision measurement of linear dimensions, particularly dimensions which are required to be extremely accurate as in the case of precision hole diameters in machined parts.

There are many instances in which precision measurement of linear dimensions is required, and in some instances physical contact with the object of measurement is impossible, as where the object is in a heated condition, or is radioactive, or is inaccessible as in the case of a wire covered with insulation.

For example, in the production of parts having circular holes whose diameters must be extremely accurate, it is necessary to test each part for such accuracy. In the past it has been the practice in such cases to employ the gauge method, involving insertion of gauge wires or a tapered gauge pin into each hole whose diameter must be tested. This manual method is not only time consuming and expensive but it is also dependent on the operator's "touch" or "feel" and therefore it is subject to human error.

With respect to those instances where physical contact with the object of measurement is impossible, while methods and devices have been proposed for linear dimension measurement without physical contact, such methods and devices have been complicated and expensive.

The principal object of the present invention is to provide an improved method and apparatus for the stated purpose which overcomes the objections of prior methods and devices.

Another object of the invention is to provide a simple method and apparatus which enables rapid automatic measurement of linear dimensions.

In accordance with this invention, measurement of a linear dimension is effected by scanning said dimension at a predetermined constant rate with successive pulses of radiant energy occurring at a predetermined constant repetition rate, and determining the said dimension as a function of the number of pulses which occur during the scanning of said dimension. Thus where it is desired to measure the diameter of a hole or orifice, the hole may be scanned along its diameter at a predetermined rate with successive light pulses occurring at a predetermined rate, and the number of light pulses passing through the hole may be counted as a measure of said diameter. Where it is desired to measure a dimension of an object with which physical contact is impossible, such as the diameter of a wire imbedded in insulation, the pulses of radiant energy may be X-rays.

The invention may be fully understood from the following detailed description with reference to the accompanying drawing wherein FIG. 1 is a diagrammatic illustration of one embodiment of the invention which may be employed in any instance where light pulses may be utilized, as where it is desired to measure the diameter of a hole or orifice;

FIG. 2 is a face view of a portion of an apertured object showing how light pulses are caused to traverse or scan the diameter of the hole or aperture to be measured;

FIG. 3 is a similar view showing how elongated pulses may be employed to eliminate the need for accurate alignment of the hole diameter with the scan path;

FIG. 4 is a diagrammatic illustration of another embodiment of the invention employing a flying spot scanner tube; and FIG. 5 is a diagrammatic illustration of still another embodiment of the invention employing an X-ray tube.

As stated above, the method according to this invention involves scanning the dimension to be measured at a predetermined constant rate with pulses of radiant energy having a predetermined recurrence rate. In this method if the scanning pulses are of appreciable width and/or duration, it is then necessary to employ a correction factor for the pulse width and/or duration. However if the pulse is very fast and dimensionally small, the correction factor becomes negligible.

Referring first to FIG. 1, there is represented at 10 a source of a very narrow light beam 11 which is chopped into equally time-spaced light pulses by a rotary opaque light chopper disk 12. The latter is driven about its axis 13 at constant speed and it has equally-spaced apertures or light-transmissive areas arranged in a circle which successively transmit the light from source 10. The light pulses thus produced are received by a rotary mirror 14 which is driven about its axis 15 at a constant speed.

It will be appreciated that disk 12 and mirror 14 can be driven by any suitable driving means. If desired, these two elements may be driven by a common drive means represented at 16 which may comprise an electric motor and suitable gearing for driving each element at the desired speed.

The test object 17 has a circular aperture 18 whose diameter is to be determined. This object is placed so that the light pulses reflected by the rotating mirror 15 scan along the diameter of aperture 18, as shown in FIG. 2 wherein the light pulses are represented magnified as dotted circles. The light pulses which pass through said aperture are received by a phototube 19 which translates them into current pulses flowing through resistor 20. The voltage pulses thus produced across the resistor are supplied to indicator means 21 which may be a conventional counter. If desired the indicator means may be adapted to give a direct reading of the dimension being measured.

It is readily possible to provide light pulse-producing apparatus suitable for use in the system of FIG. 1. For example, with respect to the beam source 10, slit widths of spectrophotometers can be readily adjusted to 1 micron (0.0394 mil), and the same type of optical system can be employed as the source 10. Optical systems also known which will produce a light spot size of 1.5 microns. See Review of Scientific Instruments for August 1959, pp. 732, 735. Such systems are also suitable for use as the source 10.

With respect to light pulse generation, rotating mirror light pulse generators suitable for use in the system of FIG. 1 are well known. See, for example, Review of Scientific Instruments for November 1959, p. 1041. A pulse rate as high as $5 \times 10^6$ pulses per second is possible with a Model JV-2 Baird electro-optic light modulator.

If the light beam 11 is very narrow as indicated above, the dimension being measured is equal to the number of counted pulses in one sweep cycle times the linear sweep rate divided by the pulse rate. Thus $$D = \frac{NS}{P} \quad (1)$$

where D is the dimension being measured, N is the number of counted pulses, S is the linear sweep rate, and P is the pulse rate. Since S and P are known constants whose ratio is a known constant which can be represented as K, the foregoing equation reduces to $$D = KN \quad (2)$$

Thus the dimension being measured is equal to the product of the constant K and the number of counted pulses. It will be seen therefore that with the sweep rate and the pulse rate fixed, the dimension being measured is a direct function of the number of counted pulses, and the indicator means can be calibrated to give a direct reading of said dimension. In the case of measurement of the diameter of a circular aperture, the test object is adjusted perpendicularly to the sweep direction to give maximum count.

In the case of measurement of a dimension such as the diameter of a hole or orifice, to eliminate the necessity for accurate alignment of the dimension with the scan path, elongated pulses may be employed as shown in FIG. 3 wherein the elongated pulses are represented magnified in dotted outline.

It will be apparent that the embodiment shown in FIG. 1 may be modified with respect to the pulsing of the light and the pulse scanning of the dimension to be measured. For example the pulsing might be done by pulsing the light source itself, and the scanning might be done by moving the test object, as on a conveyor, across the pulse path instead of employing a rotating mirror.

Apparatus of the character provided by this invention can be made to be extremely sensitive, as may be seen from the following discussion.

The usual counting error of a conventional pulse counter is considered to be about 1 pulse per total count, i.e., in this case 1 pulse per sweep. Assume that other factors, such as mechanical vibrations, fluctuations in light intensity, etc., increase the error to as much as 5 pulses per sweep. To evaluate this in terms of error in the dimension measurement, we can use Equation 1 above, making $N=5$. The pulse rate P can be taken as $5\times10^6$ pulses per second. For measurement of hole diameters of 3 to 10 mils, S can be taken as 10 mils per second. Then, using Equation 1, $$D=\frac{5\times 10 \text{ mils/sec.}}{5\times 10^6/\text{sec.}}=10^{-5} \text{ mil}=0.00001 \text{ mil}$$

Even if we allow for reduction of this figure by a factor of as much as 100 due to instabilities in the pulse repetition rate, sweep rate, etc., the sensitivity of the system is still potentially of the order of 0.001 mil.

Referring now to FIG. 4, there is shown therein an embodiment of the invention employing a flying spot scanner tube 22. In this instance the electron beam within the tube is caused to scan in a single line horizontally or vertically by deflection current supplied to a deflection yoke 23 from conventional horizontal or vertical scanning circuits 24 controlled by the usual synchronizing generator 25. The beam may be blanked during retrace by the usual blanking signal circuitry 26 also controlled by the synchronizing generator. The pulsing of the light emitted by the screen of tube 22 may be effected by a light chopper mask 27 applied to the face of the tube. This mask may be a film having alternate opaque and transparent portions along the scan path. Alternatively the electron beam could be pulsed.

Assuming that it is desired to measure the diameter of a hole or aperture 28 in a test object 29, the latter is placed so that the diameter of the hole 28 is aligned with the scan path of the electron beam. A phototube 30 receives the light pulses transmitted by the hole 28 and produces voltage pulses across resistor 31 which are supplied to the indicating means 32.

Referring now to FIG. 5, there is shown therein an embodiment of the invention employing an X-ray tube. Such an embodiment may be employed where light pulses cannot be used, as where it is desired to measure the diameter of a wire embedded in insulation. An X-ray tube 33 emits X-rays in the direction of a lead shield or plate 34 which prevents passage of the X-rays except through a very narrow aperture 35 so as to form a very narrow X-ray beam 36. The beam is chopped into pulses by a rotating chopper disk 37 which is driven at constant speed about its axis 38, and which may be a lead disk having equally-spaced apertures arranged in a circle. The test object 39, which is shown as an insulated wire, may be moved at a predetermined constant rate, as on a driven carriage 40, so that the pulses scan across it. A radiation detector 41 translates the X-ray pulses into current pulses, and the resulting voltage pulses across resistor 42 are supplied to the indicator means 43. Since the X-ray transmissivity of the wire is different from that of the insulation, recognizable voltage pulses are produced across resistor 42 as the X-ray pulses scan across the wire.

The radiation detector 41 may be of any suitable form. For example, it may comprise simply a fluorescent screen and a phototube.

The indicator means 43 may also be of any suitable form. For example, it may be an oscilloscope to which the voltage pulses across resistor 42 are supplied. Then the visible pulses produced by scanning across the wire will be of noticeably smaller amplitude than the other pulses due to the fact that the wire has lower X-ray transmissivity than the insulation. In fact, even if the wire were completely opaque to X-ray pulses, the number of pulses occurring during the scanning across the wire would be indicated by the interval of absence of pulses, since the scanning and pulsing rates are known constants.

It will be apparent that the pulsing of the X-ray beam might be effected by pulsing the X-ray tube instead of employing a chopper disk.

From the foregoing description it will be seen that this invention provides a simple method and apparatus which enables automatic direct indication of a dimension being measured. Moreover, as shown above, with this invention it is possible to measure dimensions to extreme tolerances.

While the invention has been illustrated and described with reference to certain embodiments, it will be understood that it is not limited thereto but contemplates such modifications and further embodiments as may occur to those skilled in the art.

I claim:

1. Apparatus for measuring a dimension of a light-transmissive area such as a hole in an object, comprising means for producing a light beam, means for chopping said beam into successive light pulses having a predetermined recurrence rate, means comprising a rotating mirror for causing a series of said light pulses to scan the dimension to be measured at a predetermined rate, and means for detecting and counting the light pulses transmitted by said area in the course of a scan as a measure of said dimension.

2. Apparatus for measuring a linear dimension of a region which is transmissive of radiant energy, comprising means for scanning said dimension at a predetermined constant rate with a series of pulses of radiant energy recurring at a predetermined constant rate throughout a scan of said dimension, and means for detecting the pulses of radiant energy transmitted by said region in the course of a scan of said dimension, the number of such transmitted pulses being a measure of said dimension.

3. Apparatus for measuring a linear dimension of a region which is transmissive of radiant energy, comprising means for scanning said dimension at a predetermined constant rate with a series of pulses of radiant energy recurring at a predetermined constant rate throughout a scan of said dimension, means for translating the radiant energy pulses transmitted by said region in the course of a scan of said dimension into electrical pulses, indicator means, and means for supplying said electrical pulses to said indicator means, the number of radiant energy pulses transmitted by said region in the course of a scan of said dimension being a measure of said dimension.

4. Apparatus for measuring a linear dimension of a region which is transmissive of light, comprising means for scanning said dimension at a predetermined constant rate with a series of pulses of light recurring at a predetermined constant rate throughout a scan of said dimension, and means for detecting the light pulses transmitted by said region in the course of a scan of said dimension, the number of such transmitted pulses being a measure of said dimension.

5. Apparatus for measuring a dimension of a light-transmissive area such as a hole in an object, comprising means for producing light pulses having a predetermined recurrence rate, means for causing a series of said light pulses to scan the dimension to be measured at a predetermined rate, and means for detecting and counting the light pulses transmitted by said area in the course of a scan as a measure of said dimension.

6. Apparatus for measuring a dimension of a light-transmissive area such as a hole in an object, comprising means for producing light pulses having a predetermined recurrence rate, means for directing said light pulses in a scanning motion so as to cause a series of said light pulses to scan the dimension to be measured at a predetermined rate, and means for detecting and counting the light pulses transmitted by said area in the course of a scan as a measure of said dimension.

7. Apparatus for measuring a linear dimension of a medium which is transmissive of X-ray energy, comprising means for scanning said dimension at a predetermined constant rate with a series of pulses of X-ray energy recurring at a predetermined constant rate throughout a scan of said dimension, and means for detecting the X-ray pulses transmitted by said medium in the course of a scan of said dimension, the number of such transmitted pulses being a measure of said dimension.

References Cited in the file of this patent

UNITED STATES PATENTS

| | | |
|---|---|---|
| 2,659,823 | Vossberg | Nov. 17, 1953 |
| 2,763,784 | Webster | Sept. 18, 1956 |
| 2,937,283 | Oliver | May 17, 1960 |
| 2,999,944 | Laycak | Sept. 12, 1961 |
| 3,003,064 | Astheimer | Oct. 3, 1961 |